United States Patent

Greenwood et al.

[15] 3,652,231
[45] Mar. 28, 1972

[54] RECONDITIONING SYSTEM FOR MOVING COLUMN OF REFORMING CATALYST

[72] Inventors: Arthur R. Greenwood, Niles; Kenneth D. Vesely, Arlington Heights, both of Ill.

[73] Assignee: Universal Oil Products Company, Des Plaines, Ill.

[22] Filed: Sept. 25, 1969

[21] Appl. No.: 860,904

[52] U.S. Cl. ............................23/288 G, 208/140, 252/415, 252/418
[51] Int. Cl. ....................B01j 9/08, B01j 11/18, B01j 11/80
[58] Field of Search .................252/415, 417, 418; 208/140, 208/139; 23/288.3 G, 288 R

[56] References Cited

UNITED STATES PATENTS

| | | | |
|---|---|---|---|
| 2,303,717 | 12/1942 | Arveson | 23/288 |
| 2,390,708 | 12/1945 | Hemminger | 252/418 |
| 2,493,218 | 1/1950 | Bergstrom | 23/288 |
| 2,516,943 | 8/1950 | Barber | 252/418 X |
| 2,534,859 | 12/1950 | Evans | 23/288 |
| 2,775,547 | 12/1956 | Ardern et al. | 23/288 |
| 2,835,629 | 5/1958 | Berg | 252/418 X |
| 2,856,350 | 10/1958 | Love | 208/140 |
| 2,934,493 | 4/1960 | Borgerson | 208/140 |
| 3,134,732 | 5/1964 | Kearney | 208/140 |
| 3,243,384 | 3/1966 | Raarup, Jr. | 252/415 |
| 3,375,190 | 3/1968 | McHenry, Jr. et al. | 208/140 X |
| 2,835,560 | 5/1958 | Bason et al. | 23/288 |

Primary Examiner—Daniel E. Wyman
Assistant Examiner—Paul E. Konopka
Attorney—James R. Hoatson, Jr. and Philip T. Liggett

[57] ABSTRACT

A system for effecting the reconditioning of catalyst particles used in the reforming of a hydrocarbon stream which provides a vertically elongated confined chamber that will have the particles flow down between screens of perforated plates in a descending column through a carbon burn-off section and a halogenation section. A preferred design provides for an annular-form column of particles with gas flows being out-to-in laterally through the column and, in addition, incorporates a drying section in the lower portion of the chamber. An overall system with a preferred design also combines means for scrubbing the flue gas stream from the burn-off section and returning it to the chamber and, in addition, combines means for continuously recycling a steam-halogen-air stream through the halogenation section.

10 Claims, 5 Drawing Figures

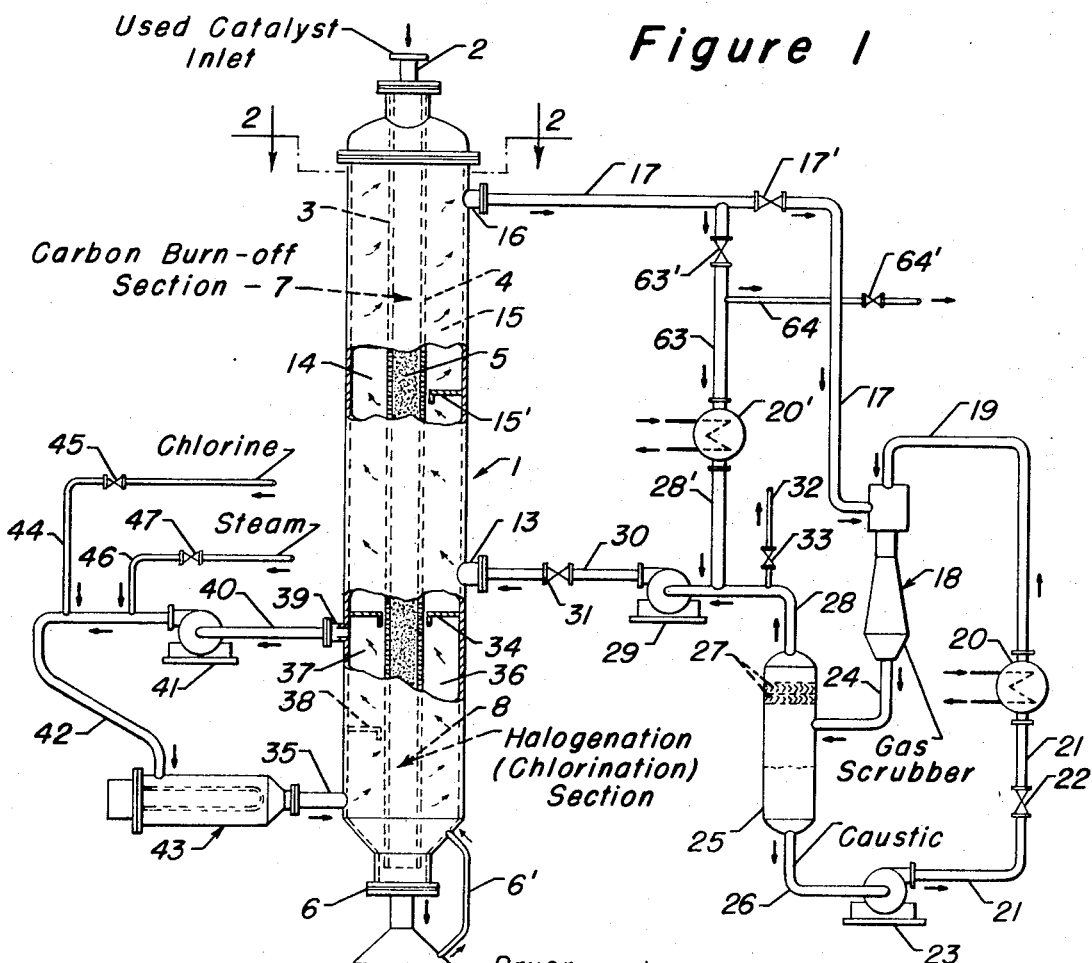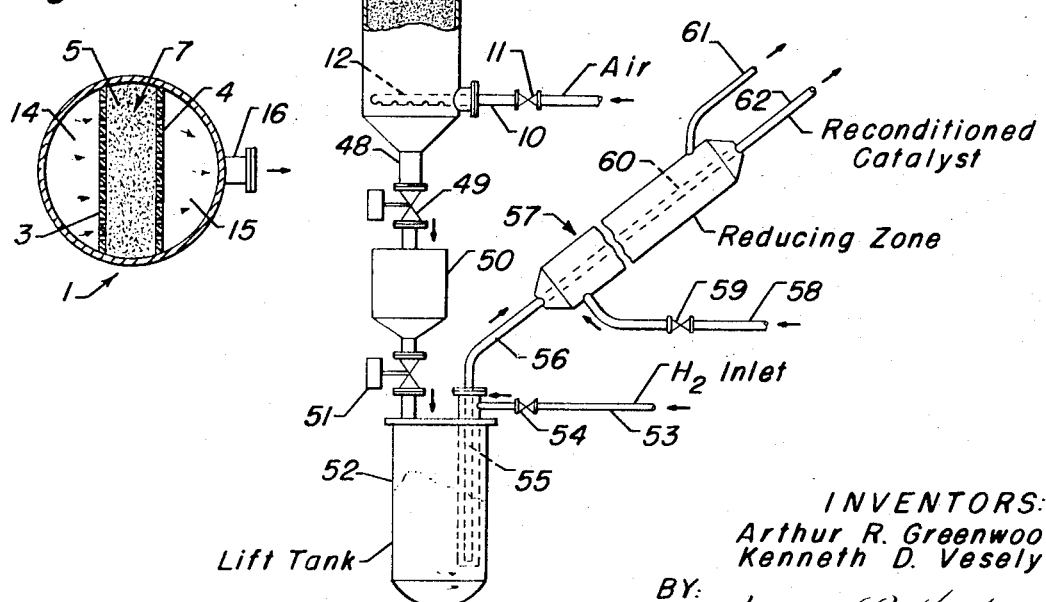

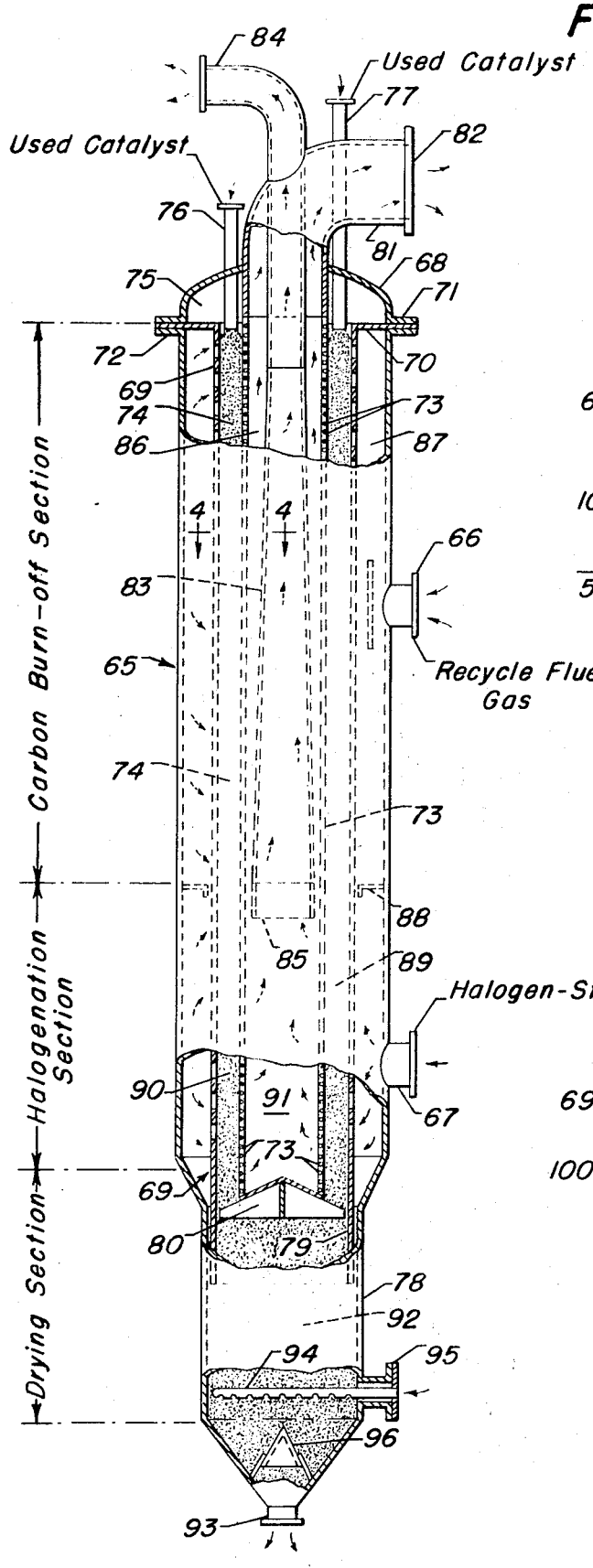
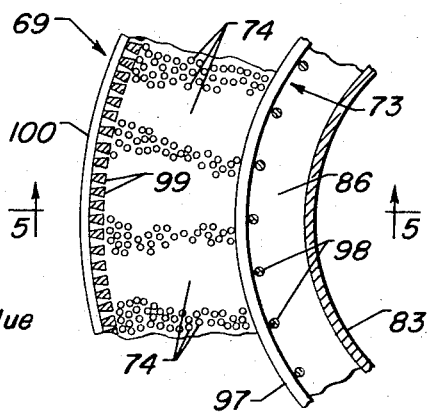
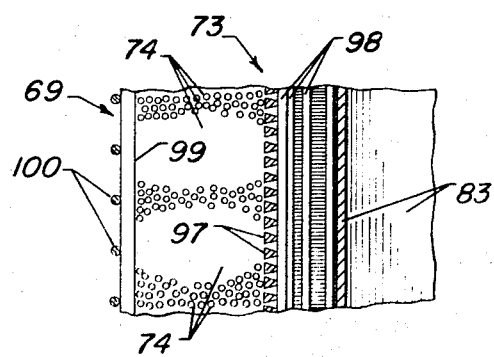
Figure 3
Figure 4
Figure 5
INVENTORS:
Arthur R. Greenwood
Kenneth D. Vesely

RECONDITIONING SYSTEM FOR MOVING COLUMN OF REFORMING CATALYST

The present invention relates to a method and means for effecting the regeneration or reconditioning of used, carbonized catalyst particles. More specifically, the present invention is directed to a unitary system for effecting the multiple stage reconditioning of contacted subdivided particles of reforming catalyst, with such particles being contacted by the vaporous and gaseous reconditioning streams as they move in a descending column under controlled gravity flow conditions.

In connection with most hydrocarbon processing operations which are carried out in the presence of a catalyst, it is quite conventional to provide means for effecting a periodic regeneration of the catalyst particles; however, in connection with the catalytic reforming of a naphtha or other hydrocarbon charge stream and particularly with a platinum containing catalyst, most of the process units have operated with a fixed bed of catalyst for long periods of time without making provision for catalyst regeneration or reconditioning. At such times as reconditioning seemed necessary, the reactors were shut down and the catalyst has been entirely removed from each chamber and replaced by new catalyst or catalyst which was reconditioned at a remote zone. Alternatively, certain plants have been designed with a "swing-reactor", i.e., an extra reactor, and in addition, have had elaborate piping systems so that one bed at a time could be taken out of service and undergo an in situ regeneration. Neither the complete change of catalyst nor the "swing-reactor" method of regeneration have provided really satisfactory systems for maintaining desired catalyst activities and high conversions in the multiple reactor bed reforming units and, as a result, it has been found advantageous to provide for a moving bed catalytic reforming system and a moving bed regeneration system so that there could be an interconnection between the two for, in turn, providing an optimum overall continuously operating plant. It is also of actual advantage to maintain a continuous operation of a reforming unit so as to have a continuous supply of hydrogen for use in various hydrogen consuming processing units in the refinery area.

Accordingly, it may be considered a principal object of the present invention to provide an improved form of reconditioning system which makes use of a gravity flow of catalyst particles down through a series of regeneration stages.

It is a further object of the invention to provide an apparatus arrangement which effects contact of the catalyst by lateral flow of the reconditioning streams while the particles are in a descending annular-form column.

In still another aspect, the invention provides an improved unitary regeneration chamber which has multiple contact sections and means for accommodating the high temperature expansion movements of the chamber internals.

The terms "regeneration" and "reconditioning" are used interchangeably in the present application and refer to more than one contacting stage or zone, as well as multiple steps of processing. In other words, there is more than the burn-off of carbon involved in the overall procedure.

Broadly, the present invention provides an apparatus system for effecting the moving bed regeneration of subdivided particles used in the reforming of hydrocarbons, which comprises in combination: an elongated vertically positioned confined chamber having an upper carbon burn-off section and a lower halogenation section, said chamber further having internally positioned spaced apart and vertically oriented perforate screen means thereby providing for a descending column of particles therethrough, particle inlet means to the upper end of said chamber and to the zone between said perforate screen means to provide for a descending column of particles, gas inlet means to said carbon burn-off section and to one side of said screen means and to one face of said column of particles therein and a flue gas outlet means from the opposing side of said screen means and opposing face of the column of particles and from said chamber, whereby gas flow is effected transversely through said column of particles, a halogen gas inlet means to said halogenation section and to one side of said screen means for said column of particles therein and a residual gas outlet means from the opposing side of said screen means and from said chamber, whereby gas flow through such section will be transversely through the descending column of particles, and catalyst particle withdrawal means connects with the lower portion of said chamber and from the lower end of the descending column of particles therein.

In another aspect, the present invention provides a method for continuously regenerating contacted carbon containing catalyst particles withdrawn from a hydrocarbon reforming process zone which comprises: (a) passing the withdrawn particles to the upper portion of a confined regeneration zone, (b) moving said catalyst through at least a portion of such zone as an elongated moving-bed column, (c) passing an $O_2$ containing stream into contact with the latter to effect a burning and removal of carbon from said particles, (d) passing the resulting contacted particles in the continuing moving-bed column to a lower portion of said regeneration zone and contacting them with a halogen containing stream to effect halogen addition thereto, (e) subsequently passing the halogenated and substantially carbon free particles to a drying zone and contacting them therein with a dry-air stream to effect the removal of excess adsorbed water or undesired gaseous components while permitting the latter stream to commingle with the halogen containing stream passing through the particles in the preceding contacting stage.

It is a particular feature of the present invention, as noted hereinbefore, to provide a unitary system, or more particularly, an elongated chamber which permits a descending column of catalyst particles to move successively through various stages, or sections of the chamber, whereby the particles may be successively contacted with the desired reconditioning streams. In other words, the descending column will be contacted by a controlled $O_2$ content carbon removal stream in a first section, contacted by a halogen-steam containing stream in a second and next lower section or stage, and subsequently contacted by a hot air stream in a third stage to effect drying. The catalyst particles will pass as a continuous column, even though flow may be periodically stopped and started, and the rate of flow may be made to be the same through each of the contacting sections although contacting periods may be varied by the cross-sectional area or length of the descending column within each section of the elongated chamber.

Although not limiting, the present improved apparatus arrangement is particularly adapted to carry out the reconditioning of a small spherical form of reforming catalyst used to convert a naphtha charge stream at conventional reforming conditions. Generally, catalytic reforming of hydrocarbon streams has been effected with the use of platinum containing catalysts in fixed bed units and such types of catalysts are well known to those skilled in the reforming art. Typically, the platinum-alumina-halogen catalysts, which have been used, or which may be used in the present arrangement, will be in the one thirty-second to one-eighth inch diameter range and preferably of quite spherical form so as to provide a free-flow characteristic that will not readily bridge or block the descending column system. More specifically as to type, the catalyst will have platinum composited on alumina in an amount from about 0.1 percent to about 3 percent platinum by weight of the alumina. Also, halogen, as fluorine or chlorine, or a combination of the two, may be present in an amount from about 0.1 percent to 8 percent by weight of the alumina. Chlorine is generally used as the halogen and it is present in an amount from about 0.05 percent to 5 percent by weight of the alumina. In the reforming zone, hydrogen is usually present in a substantial amount which may vary from a mole ratio of about 1:1 to 10:1 and, as a result, carbon formation is rather slow and the catalyst may be used over relatively long periods of time. However, it is contemplated that the carbon content on the catalyst particles charged to the present regeneration or reconditioning unit will have on the order of 2 percent to about 5 percent carbon by weight of the catalyst.

With respect to the internal design of the elongated vertical regeneration unit, various types of screens or perforate plate means may be utilized to channel the catalyst particles into a narrow confined column so that such particles may be contacted in successive stages by gaseous or vaporous treating streams passing laterally therethrough while in a descending column. The perforate screen or plate means may comprise two spaced apart flat members to form a generally rectangular form descending column of particles but, in a preferred embodiment, there will be utilized two cylindrical form screens with one being concentric within the other so that there is a resulting annular-form descending column of particles. Also, preferably the contacting vaporous or gaseous streams will have out-to-in flows through the bed of particles to effect the desired treatment of such particles. In still another aspect with respect to the screen construction, each of the particle confining screens will, in a preferred construction, be fabricated in a manner using wire of wedge-shape having a cross-sectional area decreasing in a direction that is away from the particle side of the screen. In other words, the particles will flow downwardly along the face of the screen, in each instance, which has the wide portion of the wedge-shaped wire contacting the particles so that if any particles, or pieces thereof, do pass through openings between wires, they will then flow freely outwardly from the zone of the confined column of particles into a space having an increasing cross-sectional area.

A preferred reconditioning column design will also be constructed in a manner to provide for the thermal expansion and contraction of the internal screen members and interior conduit members so as to preclude the possibility of deformation of such members which might occur through changing temperature conditions. In other words, a preferred design and arrangement provides for the suspension of the catalyst confining screen members from the top portion of the unitary chamber as well as provide for the expansion of any internal conduit means whereby thermal movements will be accommodated vertically within the lower portion of the elongated chamber. In a secondary aspect, a preferred construction further provides for the assembly and introduction of all of the internal sections through a removable end portion of the chamber.

In an overall aspect of the present invention which utilizes an elongated vertically oriented unitary chamber which accommodates a descending column of catalyst particles, there may also be provided means for introducing the various reconditioning streams into the successive contacting zones as well as means for recycling a major portion of the contacting streams through the unitary chamber. In other words, means is provided for scrubbing the combustion gas stream leaving the upper carbon burn-off section so as to primarily remove sulfur dioxide, and then returning a major portion of the stream under controlled oxygen content conditions to the inlet of the carbon burn-off section. Also, there may be means provided in combination with the vertical unitary chamber to withdraw the chlorine containing contacting stream from the halogenation section and add steam and additional chlorine thereto prior to reheating and recycling into the inlet means provided for the halogenation section.

Reference to the accompanying drawings and to the following descriptions thereof will serve to more clearly set forth the present improved catalyst reconditioning system as well as describe various advantageous features which will be obtained through the use of such system, and as particularly adapted for reconditioning a platinum containing reforming catalyst.

DESCRIPTION OF THE DRAWING

FIG. 1 of the drawing is a diagrammatic flow system indicating the utilization of a unitary vertically elongated chamber for accommodating a descending column of catalyst particles.

FIG. 2 is a sectional plan view, as indicated by the line 2—2 in FIG. 1, showing that the descending column of catalyst particles is maintained as a thin bed between spaced screen members.

FIG. 3 of the drawing is a sectional elevational view of a preferred form of unitary reconditioning chamber where the descending catalyst is maintained between cylindrical screen members providing an annular-form column.

FIG. 4 of the drawing indicates in an enlarged partial sectional view the concentric arrangement of screen members, as shown by the line 4—4 in FIG. 3.

FIG. 5 is a partial elevational view indicating particularly the use of wedge-shaped wire to form the screen members of the unit, as indicated by the line 5—5 in FIG. 4.

Referring now particularly to FIGS. 1 and 2 of the drawing, there is shown a vertically elongated column 1 adapted to contain a plurality of contacting sections for the regeneration of used catalyst particles which are introduced into the upper portion of the chamber by way of an inlet 2. In accordance with the present invention, internal screens or perforate plate means such as 3 and 4 are spaced from one another so as to provide a relatively thin descending column of particles 5 which will move periodically or continuously in a gravity flow manner from the top of the chamber to the outlet end 6. The present embodiment indicates an upper elongated carbon burn-off section 7 and a lower halogenation section 8 which is of less height than the upper section inasmuch as the contact time period generally will be less than that required in the carbon burn-off section. There is also indicated below the lower end of the chamber 1, and connecting with outlet end 6, a drying chamber 9 which is adapted to receive dry air by way of line 10 having controlled valve 11 effecting the distribution through a perforate ring or other distribution means 12. The air and stripped vapors and gases from chamber 9 can pass from the upper portion thereof into the lower opening 6 of chamber 1 as well as through a by-pass line 6' and thence into the particles in the halogenation section 8, as well as into the burn-off section 7. Actually, inasmuch as it is not required to preclude the passage of a gaseous stream upwardly from chamber 9, such chamber may, in an alternative arrangement be provided directly within the lower portion of the elongated chamber 1.

Diagrammatically, there is indicated the recirculation of a flue gas stream into the lower portion of the carbon burn-off section 7 by way of inlet means 13 such that the gas stream passes laterally below partition 15' and through the descending column of particles 5 thence carries upwardly through the open internal section 14 and laterally back through the particles into a collection section 15 which in turn discharges into outlet 16. The latter discharges into a conduit 17 having valve 17' which connects with a gas scrubber 18 for the removal of sulfur dioxide which may be contained in the combustion products stream. The scrubber 18 is indicated to be of the venturi-type which receives a recirculated caustic stream by way of line 19 and cooler 20 as well as from line 21 with valve 22 that in turn receives the fluid from pump means 23 and from line 26 connecting to the lower end of a caustic chamber 25. It is, of course, not intended to limit the present regeneration system to the use of any one scrubber means, since other concurrent and countercurrent scrubbers may well be used. However, in this case, the flue gas stream and caustic from scrubber 18 passes by way of line 24 into the caustic separating chamber 25 whereby separated caustic will flow into outlet line 26 and to pump 23 while the resulting scrubbed combustion gas stream will pass through mist extracting means 27 into conduit 28 to carry to blower means 29 and into conduit 30 having controlled valve 31 which effects the reintroduction of the gases into inlet means 13. A portion of the combustion gases is shown vented from the system by way of vent line 32 having control valve 33.

It may also be noted that where low sulfur content feed stocks are being used and there is not a high sulfur dioxide content in the burn-off gases, then the entire caustic scrubber operation may be eliminated. In this event, valve 17' is closed and the gas stream is recycled by way of line 63 having valve 63' into cooler 20' and thence into conduits 28' and 28 to reach blower 29. Also a portion of flue gases may be vented by way of line 64 with valve 64'.

In the lower halogenation section 8, which is separated from the upper burn-off section 7 by way of partitioning means 34, there is provided means for introducing a reconditioning stream such as chlorine along with steam and air by way of an inlet means 35. Thus, halogen addition may also be provided as a step in the system by having lateral flow contacting of the descending column of particles. Where desired, and as shown by the present embodiment, there is an initial lateral flow below partition 38 into zone 36 and then a second lateral flow into a section 37 formed above partition plate 38 whereby the resulting unadsorbed halogen and steam may be discharged by way of outlet means 39. Of course, a certain small portion of the unadsorbed steam and halogen may pass upwardly through the descending column of particles 5 so as to pass the partitioning means 34 and reach the carbon burn-off section 7.

In the preferred system, there is means provided for recycling the steam and halogen stream from outlet 39 by passing such stream into conduit 40 connecting with blower means 41 which in turn discharges into conduit means 42 connecting with a heater or heat exchange means 43. The latter connects with and discharges into inlet means 35 for the halogenation section 8. A charge line 44 with control valve 45 is indicated as providing means for introducing chlorine and/or other halogen into the system by way of line 42, while line 46 with control valve 47 also provides means for introducing additional steam into the reconditioning system. The heater 43 may be one which utilizes hot-gases or vapors to be in heat exchange relationship with the halogen-steam-air stream; however, electrical heating or other suitable forms of heat addition may well be utilized in the present system.

As a still further step for reconditioning a reforming catalyst prior to its return back to a reforming reactor, it is necessary that there be a final reduction of the substantially carbon-free, rehalogenated particles in the presence of hydrogen or other suitable reducing agent at a high temperature which may be in the range of 600° to 1,200° F. for a suitable reducing time period. The diagrammatic embodiment of FIG. 1 provides, in the lower portion thereof, a reducing step as provided by the commingling of hydrogen with the catalyst particles passage through a heating zone. Where hydrogen is utilized, means is provided to prevent its passage into the halogenation zone and the carbon burn-off zone. Thus, as provided by the present improved system, there is movement of reconditioned particles to the reduction step through a lock-hopper or other equivalent means precluding gas passage from one section to another. Specifically, there is indicated the passage of dried catalyst particles from the lower portion of chamber 9 by way of outlet means 48 to a valving means 49 thence into a lock-hopper means 50. The latter permits periodic discharge of particles therefrom by way of valve 51 into a tank means 52. Also, though not shown, there may be a purging of particles in the lock-hopper zone. In this instance, the catalyst particles are discharged or withdrawn from the lift tank 52 by use of a fluidized lift means utilizing hydrogen introduced by way of inlet line 53 and valve 54 to an inner lift pipe 55 extruding upwardly to conduit 56 and to a heating-reducing zone 57. The latter is provided with hot gases, vapors or other heating medium by way of inlet line 58 and valve 59 so that there is indirect heat exchange relationship with internal conduit means 60 to effect a high temperature reduction of the catalyst particles in the presence of the hydrogen reducing medium. Heat exchange fluid from heater 57 may be discharged by way of line 61 while outlet conduit means 62 provides for the discharge of fully reduced and conditioned catalyst for reuse in a reforming reactor.

It should be pointed out that the reducing arrangement illustrated is merely diagrammatic and other mechanical means for passing a hydrogen catalyst mixture to a suitable heating and reducing zone may be embodied in the system. For example, a still lower positioned reducing section may be provided directly below the dryer section 9 and the lock-hopper means 50 so that there is a gravity flow of catalyst particles and the contacting of such particles in a lateral flow arrangement or by fluidized contact, with the reducing stream effecting the fluidization. In still another arrangement, the reconditioned but unreduced catalyst particles may be carried to a reforming reactor or at least directly adjacent the reforming zone where the actual heating and high temperature reduction is effected by heat supplied from the hydrocarbon vapors being introduced into the reforming reactor. In any case, the reduction step embodies the commingling of hydrogen with the catalyst particles under high temperature reducing conditions for a sufficient length of time effective to complete the desired reducing step prior to having the particles continue into the actual hydrocarbon conversion zone, which period of time is usually at least about 2 hours.

Referring now particularly to FIGS. 3, 4, and 5 of the drawing, there is indicated a preferred method of constructing the elongated chamber for accommodating a descending column of used catalyst particles through multiple reduction-stages. In this preferred construction and arrangement, there is an elongated cylindrical-form chamber 65 having gas-vapor inlet means indicated at 66 and 67 as well as a removable upper head section 68 whereby certain of the internal sections may be inserted or withdrawn from the interior of the chamber. The larger diameter or outer cylindrical-form screen member 69 which is inside the chamber 65 has an upper flange 70 that is adapted to be supported between flange portions 71 and 72, which are, respectively, parts of the head section 68 and the chamber 65. The flange 70 is such as to provide for the suspension of the screen member 69 at a spaced distance from the inside of the wall over chamber 65 and provide a barrier or seal to cause all the inlet gases to pass through the annular bed of catalyst. As internal, smaller diameter screen member 73 is also spaced from 69, while being supported from the top of the removable head section 68, so as to provide an annular space for a descending column of particles 74 which communicates with an upper catalyst receiving zone 75, in turn receiving catalyst particles by way of inlet conduit means such as 76 and 77.

It will be noted that the respective lower ends of screen members 69 and 73 are free to move and expand downwardly under high temperature conditions and accommodate both expansion and contraction movements without causing a buckling of either member. Also, it will be noted that a lower, small diameter wall section 78 for the elongated chamber 65 is sized to provide a slip fit at zone 79 with respect to the lower end portion of screen member 69 so that there is a guide means for the lower end of the latter and a catalyst seal. Also, the lower end portion of screen member 73 is provided with suitable guide fins 80 to hold such member concentrically within the interior of outer screen member 69.

At the upper end of the chamber, above the removable head section 68, the open end portion of the inner cylindrical screen member 73 connects to and communicates with an outlet section 81 which, in this instance, is formed as a substantially 90° bend providing a gas outlet port 82. Within the inner screen member 73, there is an elongated axially positioned gas outlet conduit 83 which continues on through the wall of conduit section 81 and discharges into a different or second gas outlet portion 84. Preferably, the inner conduit 83 is tapered and provides a relatively large open end section 85 which is adapted to receive gas and vapors from the lower halogenation section of the elongated chamber 65 and discharge them to the outlet section 84. A smaller diameter upper portion of conduit 83 permits a gas collection space 86 therearound which increases in cross-sectional area in a downstream direction whereby the gas stream passing from inlet 66 into annular section 87 and thence through the catalyst bed 74 will be collected in such inner zone 86 for discharge by way of outlet means 82.

An intermediate partitioning means in the shape of an annular ring 88 is shown in the space around the external screen member 69 so as to provide an upper internal portion for chamber 65 which may be designated as a carbon burn-off section. Generally, this section will comprise a major portion of the descending annular column of catalyst particles 74, while the descending column portion therebelow, indicated as 89, will provide a halogenation section. Thus, in this latter section a halogen-steam-air stream, which is provided by way of inlet means 67, will flow into an annular distribution zone 90 and and thence through the catalyst column 89 into the internal collection space 91, and excess halogen and steam from the latter step will pass upwardly therethrough into the inlet end 85 of internal conduit means 83.

In the lowermost section of the vertical chamber 65, as encompassed by wall section 78, the catalyst particles are collected in a descending bed 92 from the lower end of the annular column 89 whereby they may be dried prior to being discharged by way of a lower end port 93. A hot and dry air stream, or other suitable drying medium, is introduced into the lower end portion of the drying section 92 by way of a perforate distributor means 94. The latter connects to and communicates with an inlet port means 95 along a lower side portion of the chamber wall section 78. Air from bed 92 will pass in part in the column of particles 89; however, a major portion will bypass into 90 zone for recirculation there, as well as pass from the top of halogenation zone 85 to the lower end of burn-off distribution section 87 so as to supply thereto.

The resulting dried and substantially reconditioned catalyst particles are withdrawn periodically, or continuously, from the lower end of the chamber 65 by way of the outlet means 93 as has been indicated and may subsequently be introduced into a suitable reducing zone through a restrictive particle passageway means which will preclude the passage of a gas or vaporous stream. Such passageway means will normally comprise a lock-hopper means and valves or the like, although other means which will preclude a back flow of hydrogen may be used. The catalyst particles, as hereinbefore noted, are preferably of a small spherical nature so that they are free flowing throughout the entire vertical column as well as through the lower moving bed section 92 comprising the drying section. In order to preclude bridging and to evenly distribute particle flow, a suitable conical-form particle diverter 96 is shown directly above the lower outlet means 93.

The size of any slots or openings within the perforate plate or screen means 69 and 73 for the present unit will be such as to correlate with the size of catalyst particles being used in the conversion system. In other words, where the catalyst particles are of the order of one-sixteenth inch diameter then the screen openings will be somewhat less in order to preclude any loss of particles through the screen members as such particles move by gravity in the descending column as provided by the present unitary system. Also, a preferred embodiment of each of the screen members 69 and 73 provides that each utilize specifically constructed screen members having wedge-shaped wire. This type of screen can be formed by having wire helically wrapped around a plurality of spaced longitudinal members in order to form a continuous open slot arrangement. The slot will, of course, be of a size to preclude the passage of catalyst particles therethrough.

As best shown in FIGS. 4 and 5, there are indicated in somewhat enlarged views, the use of inner and outer screen members, respectively 73 and 69, which have incorporated the wedge-shaped wire construction. More specifically, the inner screen 73 is formed by having a helically wrapped wedge-shaped wire 97 supported on spaced vertical bars 98 in the manner of a slotted screen construction as generally set forth in U.S. Pat. No. 2,046,458. With respect to screen 69, it has been refabricated in manner to have the wedge-shaped wire 99 run vertically over support bars 100. Preferably, both screens, 69 and 73, would have the wedge wires run vertically so as to minimize attrition of catalyst particles during their descending movement. It is to be particularly noted, however, that the wedge-shaped wires 99 and 97 have the wide side portions thereof positioned inwardly to face and contact the descending column of catalyst particles. Thus, by this arrangement, the particles are precluded from lodging within and blocking the space or holes between adjacent wires. In the event that any of the particles are of small enough size to pass through a spacing between wedge-shaped wires, then the enlarged cross-sectional area for the slots between wire members will permit the particles to pass on through the opening without any bridging or blocking effect.

OPERATION OF UNITARY RECONDITIONING SYSTEM

In order to provide an example of operation of the improved present form of unitary system, it will be presumed that the carbon burn-off step will require the catalyst particles to have a contact time of approximately 2 hours while the chlorination or halogenation will require of the order of 1 hour contact time so that, as a result, the carbon burn-off zone in annular bed section 74 above partitioning means 88 will be approximately twice the height of annular bed section 89 which opposes inlet section 90 in turn communicating with inlet means 67. At the same time, for a drying section 92, which will require approximately 2 hours of contact time, then the height of bed portion 92 will be adjusted with respect to its cross-sectional area such that each of the catalyst particles moving therethrough will require a 2 hour period for completing the descent.

With respect to the lower portion of the column, a heated stream of dry air is introduced by way of inlet means 95 and distributor 94 such that the drying will be carried out in the 800° to 1,000° F. range. Actually, the quantity of air being introduced is determined by the oxygen demand in the carbon burn-off zone which in this instance provides a gas hourly space velocity of the order of 130 to 170. This air will, in the present embodiment, carry on upwardly through the halogenation section into conduit inlet means 85 for recirculation, although a desired portion will carry laterally through a top portion of the descending column of particles in halogenation section 85 to reach the zone 86 for the air supply and for recirculation into the carbon burn-off section. Although a major portion of the air stream will be withdrawn by way of conduit 83 and outlet 84 where it will be recycled to the halogenation section in the manner of FIG. 1, that portion reaching bed section 74 will provide oxygen to the controlled carbon burn-off taking place in this upper section.

A halogen-steam stream is introduced in inlet means 67 to pass laterally through the column portion 89 to provide for adsorption of halogen into the catalyst particles and to redistribute platinum content to minimum crystallite sizes in the particles. Any excess steam and halogen will carry upwardly through the withdrawal conduit 83 to be discharged or recycled as aforedescribed. For a chlorine containing catalyst, chlorine is added in an amount to maintain of the order of about 2.5 moles per hour in the stream passing into contact with the catalyst at a temperature of the order of 930° F. Steam is admixed with the chlorine at about 450° F. and at the same time, the volume of the combined gaseous stream will be such as to provide a relatively high gas hourly space velocity of the order of 4,700.

In the upper portion of the column where a controlled oxygen content stream effects the substantial removal or burn-off of carbon which has been deposited on the used catalyst particles, there is a recycled combustion products stream maintained at a temperature of the order of 830° to 930° F., at a gas hourly space velocity which is also of the order of 4,700. The recycle will be in the manner indicated in FIG. 1 and the oxygen content present for introduction into the carbon burn-off from inlet 66 will be of the order of about 0.7 percent.

It is to be noted that the foregoing example of operation, with the various temperatures and quantities set forth, is merely by way of example and should not be considered limiting in any way, particularly since the present improved system may be operated to accommodate any given desired temperature ranges within the limits of the materials of construction. Also, the types of reconditioning streams and contact periods may be varied to suit a particular type of reforming catalyst and a particular carbon level or other condition of the catalyst leaving the hydrocarbon conversion zone. In other words, a carbon level, chlorine level, etc., leaving a particular reforming reactor may vary from time to time, or vary with different units accommodating different charge stocks with differing sulfur contents etc., so that reconditioning or regeneration conditions will be varied accordingly.

We claim as our invention:

1. An apparatus system for effecting the moving bed regeneration of subdivided catalyst particles used in the reforming of hydrocarbons, which comprises in combination:

an elongated vertically positioned confined chamber having a top portion, an upper carbon burn-off section and lower halogenation section, a screen means in said chamber suspended from said top portion of said chamber and extending downwardly substantially the length of said chamber and comprising two cylindrical-form screens concentrically disposed with respect to each other to form an annular catalyst retaining section therebetween adapted to accommodate a descending column of particles therethrough, said screens comprising vertically disposed, spaced wires, particle inlet means to the upper end of said chamber and to the zone between said perforate screen means to provide for a descending column of particles, an upper gas inlet means to said carbon burn-off section and to one side of said screen means and to one face of said column of particles therein and a flue gas outlet means from the opposing side of said screen means and opposing face of the column of particles and from said chamber, whereby gas flow is effected transversely through said column of particles, said flue gas outlet means extending upwardly from the interior cylindrical form screen means and from the exterior of a residual halogenation gas outlet conduit, said flue gas outlet means having an enlarged area gas collection section at its upper portion for flue gas flow upwardly around said residual halogenation gas outlet conduit, a lower halogenation gas inlet means to said halogenation section and to one side of said screen means for said column of particles therein and a residual halogenation gas outlet means from the opposing side of said screen means and from said chamber, whereby gas flow through such section will be transversely through the descending column of particles, said residual halogenation gas outlet means being in the form of a conduit axially positioned within the inner of said cylindrical screens and extending through said carbon burn-off section and within said flue gas outlet means, said conduit having a cross-sectional area at its lower end substantially traversing the interior of said inner concentric screen sand opening into said halogenation zone for collection and discharge of gases and vapors from said halogenation zone, a partitioning means between said burn-off and halogenation sections, and catalyst particle withdrawal means connecting with the lower portion of said chamber and from the lower end of the descending column of particles therein.

2. The apparatus as defined in claim 1 wherein said screens comprise wedge-shaped wires with the greater cross sections thereof being inwardly disposed, (and said wires being mounted vertically with respect to said chamber) whereby to minimize attrition of catalyst particles during descending movement thereof through said zones.

3. The apparatus system of claim 1 further characterized in that said residual gas outlet means from said chlorination section extends upwardly through said interior cylindrical form perforate screen means and from said chamber.

4. The apparatus system of claim 1 further characterized in that each of said perforate screen means is formed of wedge-shaped wire providing resulting wedge-shaped slots therebetween, said outer of the cylindrical screen means has the wide portion of the wedge-shaped wire along the inner surface thereof and said inner cylindrical screen means has the wider portion of the wedge-shaped wire along the outer surface, whereby any particle which may pass through spaces between wires of the screen means will pass into slots of enlarging cross-sectional area and will not clog screen openings.

5. The apparatus system of claim 1 further characterized in that a catalyst particle drying section connects with the lower portion of said chamber below said chlorination section and communicates therewith through open passageway means and a drying gas inlet means connects to a lower portion of said drying section whereby a drying gas flow will be countercurrently upwardly through the descending particles in said drying section.

6. The apparatus system of claim 5 further characterized in that a particle collection section is provided below said catalyst particle drying section and connects therewith through a gas flow restricting means, a reducing gas inlet means communicates with said particle collection section whereby such gas is commingled with the particles to provide a fluidized stream of particles for withdrawal therefrom, a conduit means for the resulting fluidized catalyst particle stream connects with a particle reducing section, and a heating medium additionally connects with the latter for indirect heat exchange with said commingled stream whereby there may be a high temperature reduction of such stream.

7. The apparatus system of claim 6 still further characterized in that said particle collection section below said drying section connects with the latter through a lock-hopper means whereby to preclude gas flow between the two sections.

8. The apparatus system of claim 1 further characterized in that the flue gas outlet means from said carbon burn-off section connects with a gas scrubber means providing a gas-liquid contact with a caustic liquid to effect the removal of sulfur compounds and conduit means and blower means connects with scrubber means with first said gas inlet means provides for the resulting scrubbed gas stream return to said carbon burn-off section for lateral flow through the descending particles therein.

9. The apparatus system of claim 1 further characterized in that the gas outlet means from said halogenation section connects with a recirculation system including conduit means, a blower means, a heating means, and steam inlet means and halogen addition means, whereby a given halogenation level and predetermined temperature level may be provided for the gaseous charge stream to the halogen gas inlet means to said halogenation section.

10. The apparatus as defined in claim 1 wherein said residual halogenation gas outlet conduit is tapered through said carbon burn-off section with an increasing cross-sectional area toward the lower end portion, whereby there is an increasing area gas collection section for flue gas flow upwardly around said conduit.

* * * * *